Patented Jan. 3, 1933

1,893,317

UNITED STATES PATENT OFFICE

ADOLPH ZIMMERLI, OF NEW BRUNSWICK, NEW JERSEY, ASSIGNOR TO ACETOL PRODUCTS, INC., A CORPORATION OF DELAWARE

PROCESS FOR THE ISOLATION OF ERGOSTEROL

No Drawing.   Application filed April 28, 1930. Serial No. 448,171.

This invention relates to the isolation of ergosterol from molds.

An object of the invention is the provision of a simple and economical process for preparing ergosterol from molds which are by-products in the manufacture of certain acids.

Another object is the isolation of ergosterol in a purer form than obtained heretofore.

Ergosterol is the precursor of vitamin D into which it is transformed on irradiation. While its presence in minute quantities has been discovered in a great many plant and animal products, its isolation has not been economically possible with the exception of yeast from which material it is generally prepared. Other known sources are ergot, bone marrow and mushrooms.

I have found that the mycelium of certain molds of the class of aspergillus, penicillium, citromyces and related molds is very rich in ergosterol, as rich as yeast itself, the ergosterol contents ranging generally between ½ and 1%. Furthermore, this seems to be practically the only sterol present while yeast contains other sterols which make the isolation and purification of ergosterol a tedious and complicated process.

The mycelium of those molds which is recovered in large amounts in the manufacture of such acids as citric, gluconic, etc. has so far been burned as the only means of getting rid of a disagreeable by-product. In accordance with my process mycelium is made to serve as a raw material from which ergosterol is prepared.

In disclosing my invention the following example is merely illustrative of obtaining ergosterol from one form of mycelium, but it is to be understood that other bases, as well as increased quantities may be used of the materials employed in carrying out the process, the important feature being that the relation or proportion of these materials be maintained with respect to one another.

In practicing the invention 1000 grams of the wet mycelium of aspergillus niger, containing about 80% moisture are placed into a three liter flask with 2000 grams of alcohol to which a solution of 10 grams of caustic soda in 10 cc. water has been added. This is heated on the steam bath for three hours with occasional shaking. It is then filtered while still hot and the residue is against treated three times with each time 300 grams alcohol, heating each time to boiling.

The united filtrates are concentrated on the steam bath until practically all the alcohol has evaporated. The residue is diluted with water to make 600 cc. This is extracted three times with 500 cc. ether each time. The ether extract is treated with anhydrous sodium sulfate and charcoal, filtered, then concentrated on a steam bath until crystals begin to form.

On cooling more crystals form; they are filtered off, washed with a little alcohol and dried. The yield is 1.5 to 2 grams of a melting point of 156–160° C. They are pure white and consist of crude ergosterol sufficiently pure for irradiation. On recrystallization from ether they have a melting point of 163°–164° and an optical rotation of 133°.

It is to be understood that although I have disclosed the invention in a preferred embodiment, modifications will suggest themselves to those skilled in the art and I wish to have it understood that such modifications as come within the spirit and scope of the invention as set forth in the appended claims are contemplated by me.

What is claimed is:

1. The process of isolating ergosterol from mycelium of aspergillus niger, consisting in extracting the mycelium with an alcoholic alkali, and re-extracting the alcoholic residue with ether.

2. The process of isolating ergosterol from wet mycelium of aspergillus niger, consisting in extracting the mycelium having a moisture content of about 80% by adding thereto a solution of alcohol and caustic soda, heating and filtering the mixture as often as may be necessary by the addition of alcohol after each filtration, and extracting the alcoholic residue with ether.

3. A step in the process of isolating ergosterol which consists in utilizing aspergillus niger as the mold source, and treating it with an alcoholic alkali.

4. The process of isolating ergosterol from mycelium of the group of lower fungi known as aspergilli, produced as a by-product in the manufacture of citric acid by fermentation processes, consisting in extracting the mycelium with alcoholic alkali, and re-extracting the alkali residue with ether.

5. A process for isolating ergosterol which comprises extracting with alkaline alcohol the plant growth of aspergillus niger produced as a by-product in the manufacture of citric acid by fermentation processes, separating the resulting extract and treating it with ether.

6. The process of claim 5 wherein the alcoholic extract is concentrated and water added thereto before treating with ether.

7. A process for isolating ergosterol which comprises extracting with a solution of alcohol and alkali the plant growth obtained as a by-product in the manufcture of citric acid by fermentation processes, separating the resulting extract and removing the ergosterol therefrom by treatment with ether.

8. A process for isolating ergosterol which comprises extracting with a solution of alcohol and caustic soda the plant growth obtained as a by-product in the manufacture of citric acid by fermentation processes, separating the resulting extract, removing the major portion of the alcohol therefrom, treating the concentrated extract with water and caustic soda, removing the ergosterol from the concentrated extract by treatment with ether, washing the ether extract, removing traces of water therefrom, and finally crystallizing the ergosterol from the washed ether extract.

9. A process for isolating ergosterol which comprises treating the mycelium of a mold selected from the group consisting of aspergillus, penicillium and citromyces with alkaline alcohol, separating the extract and re-extracting it with ether.

10. A step in the process of isolating ergosterol which consists in utilizing the mycelium of a mold selected from the group consisting of aspergillus, penicillium and citromyces as the mold source, and treating it with an alcoholic alkali.

In testimony whereof, I have hereunto subscribed my name this 25th day of April, 1930.

ADOLPH ZIMMERLI.